Patented Aug. 27, 1929.

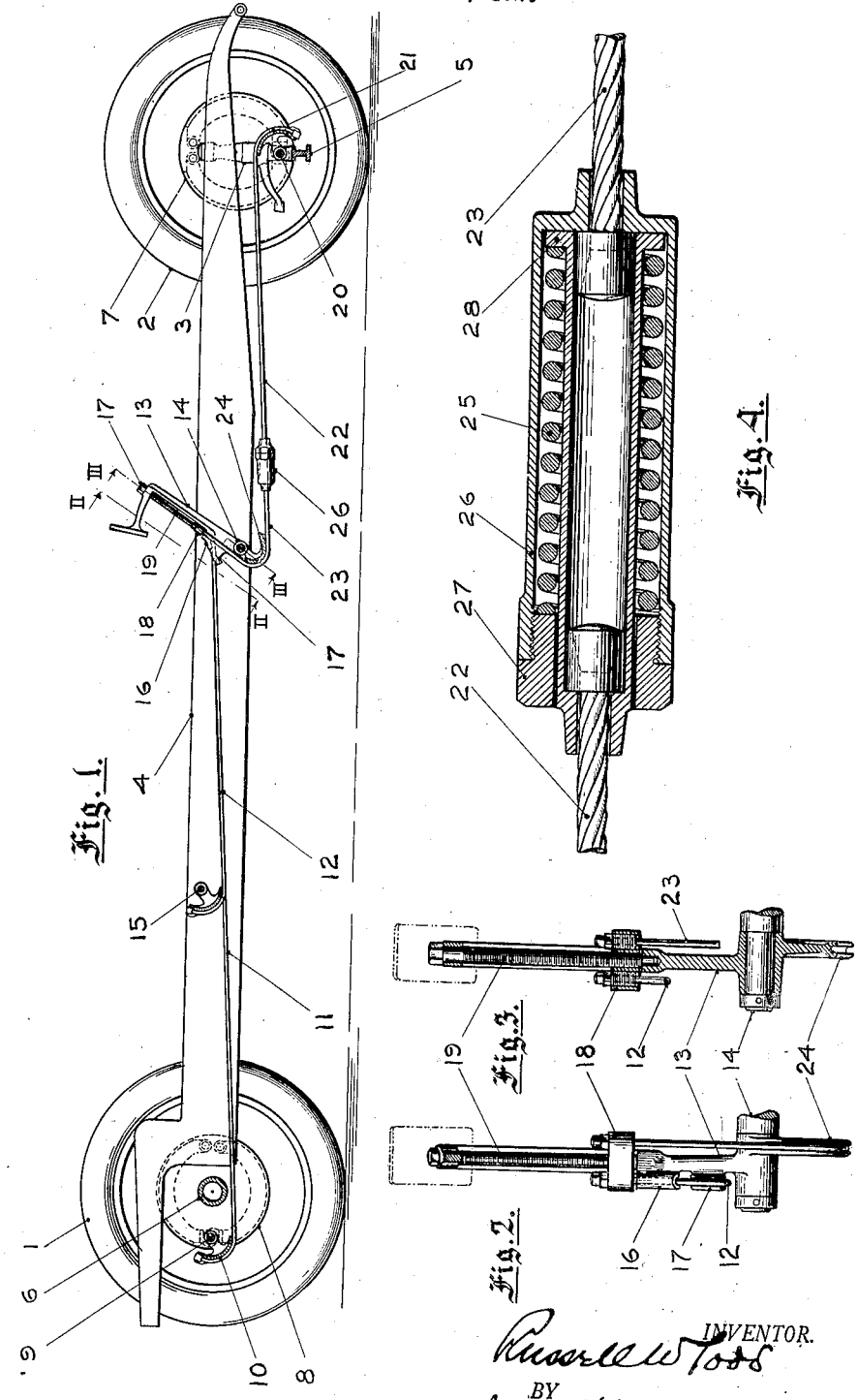

1,725,769

UNITED STATES PATENT OFFICE.

RUSSELL W. TODD, OF BRONXVILLE, NEW YORK.

AUTOMOBILE BRAKE SYSTEM.

Application filed October 6, 1923. Serial No. 666,891.

The invention is an improvement in automobile brake systems wherein a single pedal or lever applies the brakes to both the front and rear wheels and its object is the provision of simple and dependable means for preventing the locking of the steering wheels, regardless of the force applied to the brake lever or pedal and so as thereby to guard against loss of steering control of the vehicle.

In the accompany drawing:—

Fig. 1 represents more or less schematically, a conventional automobile chassis with the invention applied:

Figs. 2 and 3 are respectively sections on lines II—II and III—III of Fig. 1; and Fig. 4, is an enlarged axial section of the pressure limit device for the steering wheel brakes.

In Fig. 1, the rear wheel 1 may be assumed to be one of the driving wheels and the front wheel 2 one of the steering wheels, the conventional automobile steering knuckle being indicated by 3, and the chassis frame 4 as mounted on the front axle 5 and rear axle 6 by the usual springs which are omitted from the drawing for the sake of clearness. Each wheel is provided with a brake surface or drum indicated at 7 and 8 respectively and with internal expanding brake shoes shown in dotted lines. The brakedrums and their shoes may be organized and operated in any appropriate manner, the invention not being concerned with the kind of brake employed and being applicable with equal facility to any kind of brake system whether the same has the driving wheel brake surface on the wheels themselves or on the propelling line. In the present case each rear wheel brake is operated by a rock shaft such as 9, which can be rotated by its sector lever 10 connected by cable sections 11 and 12 to the brake pedal 13. The latter is journaled on an axis or shaft 14 fixed on the chassis in any appropriate way, and in position to be operated by the driver of the vehicle. Although only one of the rear wheels is shown in the drawing, it will be understood that the other rear wheel is equipped with a similar brake and brake shaft 9 and connected in the usual or any suitable way, to the brake pedal by an appropriate junction with the cable 11, so that the depression of the pedal will simultaneously apply the brake shoes to both rear wheels. The cable from the other rear wheel may be assumed to be joined to the cable 12, in the present case, by means of a proper cross-shaft or equalizer indicated at 15, as usual. The cable 12 is connected to the pedal 13 at one side of the latter, being trained around a curved cheek or flange 16 thereon and over an opposing cheek 17, and connected by its end to a cross-head 18 carried by the pedal structure so that it can be adjusted thereon. For this purpose the cross head is engaged to a screw 19 journaled top and bottom in the brake structure, as indicated in the drawing, the head of the screw being accessible directly in front of the foot plate of the pedal, so that the screw can be easily turned when necessary. Such operation of the screw moves the end of the cable away from or toward the fulcrum of the pedal and thereby changes the effective length of the cable and other connections to the two rear brakes. The curvature of the cheek 16 affords an easy bearing for the cable on the lever and accommodates the adjustment movement just referred to.

The brake of the steering wheel 2 is indicated in the present instance as operated by a brake rock shaft 20, through a sector lever 21 thereon and a cable line, composed of cable sections 22 and 23, connecting the sector to the pedal 13. It will be understood that inasmuch as this is a steering wheel, the shaft 20 is necessarily so mounted with relation to the brake shoes that it operates them in any position to which the wheel may be turned by the steering mechanism. The detail of this mechanism is not shown in full for the sake of clearness and because various styles of connections appropriate for the purpose are well known in the art. The rock shaft 20 may, in the present case, be understood to be also the operating member for the other front or steering wheel, or to be otherwise connected, so that both front wheel brakes are simultaneously and equally operated by force applied to the cable 23. This cable is trained over and around the curved and grooved end 24 of the pedal 13 and thence upwardly, parallel to the rear cable 12 and screw 19 to a point of connection with the opposite side of the adjustable cross head 18. The operation of the brake pedal thus simultaneously applies the brakes of all the vehicle wheels, the screw 19 being available for simultaneously adjusting the brake connections for all of them, as will be understood. Each cable connection to the cross-head 18 is adjustable thereon independently of the other, so that the relative lengths of the front and rear cables can also be regulated when necessary. It will be understood that the brake pedal, and other parts of the brake connections are intended to be provided with the usual springs for holding the brakes off and the pedal elevated when no braking effect is desired.

The brake-pressure limit device which prevents the locking of the front wheel brakes is interposed at any suitable point between the brake pedal, or such brake operating mechanism as may be employed, and the brake shoes and, for the particular kind of brake system herein shown, is interposed between the sections 22 and 23 of the front brake cable. It comprises a spring 25 maintained under a constant and predetermined state of tension or compression, even when the brakes are inactive. The spring is conveniently mounted in a housing, such as 26, and one end thrusts against the cap nut 27 of the housing while the other thrusts against the end flange 28 of an interior member 29 telescopically arranged in the housing and nut, and surrounded by the spring, and so as to press the end flange against the end of the housing. The cable section 23 is headed and secured to one end of the housing and the other cable section 22 is similarly headed and secured to the opposite end of the telescoping member 29. In the normal use of the braking system, the force applied to the pedal is transmitted to the front brakes through the spring but without flexing or further compressing it, the said spring serving as though it were a rigid, or non-elastic link or part of the brake connections similar to that which operates the rear wheel brakes, but in the event of an application of force to the pedal so great that it would lock the front wheels causing them to slide on the ground without rolling and thus destroy the steering control, the spring yields and prevents the transmission of such a force to the brake shoes notwithstanding that the same, or a wheel-locking, force may be simultaneously applied to the rear wheel brakes. The normal tension in the spring is predetermined with reference to the area of the brake surfaces and the leverage of the brake connections to accomplish this result, imposing a predetermined limit to the pressure which can be applied to the front brakes. Where the front brakes are of the internal-expanding type, in which the brake surfaces are protected from the weather, the pressure at which they will lock is fairly constant and the pressure limit imposed by the spring can therefore be set at a sufficiently high value so that it will not impair the utility of the front brakes. The invention specially contemplates and consists in the application of the limit spring to this type of brake. Preferably the spring is made in the first instance of the proper size for the purpose stated, so that it does not require subsequent adjustment and preferably also it is permanently sealed in its housing so that it cannot be easily thereafter altered by the car user although the threading of the cap nut 27 in the housing 23 affords a possibility of subsequent adjustment, if desired. Initial adjustment of the relation of the front and rear brakes to the position of the brake pedal may be made by adjusting the cable connections to the cross-head 18 or the position of the sector levers 10 and 21 on their respective brake operating shafts, or otherwise, as will be understood, and when such initial adjustments have been made at the factory, such further adjustment as may be necessary to take up wear of the brake shoe linings, is made simultaneously, front and rear, by the manipulation of the adjusting screw 19, as already explained, but in no case can the adjustment, even though improperly done, affect the steering wheel brakes so that they can be locked and destroy steering control. It will be observed that the detail design of the spring, its location in the system, and its co-operation with other parts are all subject to modification according to circumstances and the preference of the builder without departing from the principle of the invention, now fully explained.

Claims:

1. In an automobile braking system, the combination with the driving wheel brake and the steering wheel brake and a single operating member for both brakes, of a non-elastic connection between the operating member and the driving wheel brake and a tension limiting connection between the operating member and the steering wheel brake, said latter connection being adapted to transmit safe front-wheel-braking forces without yielding and to yield on the application of excessive force, whereby the full pressure applied to the operating member can be transmitted to the driving wheel brake and only a limited pressure to the steering wheel brake.

2. The combination set forth in claim 1 in which said connection between the operating member and the front wheel brake includes a spring and means acting independently of the operating member to maintain said spring in a predetermined state of tension.

In testimony whereof, I have signed this specification.

RUSSELL W. TODD.